(12) United States Patent
Leeb

(10) Patent No.: US 10,244,748 B2
(45) Date of Patent: Apr. 2, 2019

(54) METHOD FOR MOTION CONTROL AND/OR REGULATION OF AN AGRICULTURAL DISTRIBUTION DEVICE

(71) Applicant: HORSCH LEEB Application Systems GmbH, Oberpöring (DE)

(72) Inventor: Theodor Leeb, Wallersdorf (DE)

(73) Assignee: HORSCH LEEB Application Systems GmbH, Oberporing (DE)

( * ) Notice: Subject to any disclaimer, the term of this patent is extended or adjusted under 35 U.S.C. 154(b) by 286 days.

(21) Appl. No.: 15/048,345

(22) Filed: Feb. 19, 2016

(65) Prior Publication Data
US 2016/0262370 A1    Sep. 15, 2016

(30) Foreign Application Priority Data

Feb. 20, 2015 (DE) ........................ 10 2015 102 422

(51) Int. Cl.
*A01C 23/00* (2006.01)
*A01M 7/00* (2006.01)
*A01G 25/09* (2006.01)
*G05B 19/042* (2006.01)

(52) U.S. Cl.
CPC ......... *A01M 7/0057* (2013.01); *A01C 23/008* (2013.01); *A01G 25/09* (2013.01); *A01M 7/0075* (2013.01); *G05B 19/042* (2013.01); *G05B 2219/2625* (2013.01)

(58) Field of Classification Search
CPC .... A01C 23/008; A01C 23/047; A01G 25/09; A01G 25/092; A01M 7/0057; A01M 7/0075; G05B 19/042; G05B 2219/2625
See application file for complete search history.

(56) References Cited

U.S. PATENT DOCUMENTS 5,348,226 A * 9/1994 Heiniger ............. A01M 7/0057
                                                         239/1
6,293,475 B1 * 9/2001 Sobolik ............... A01M 7/0075
                                                         239/159
(Continued)

FOREIGN PATENT DOCUMENTS

EP    2186405 A1    5/2010
EP    2591657 A1    5/2013
(Continued)

*Primary Examiner* — Stephen W Smoot
(74) *Attorney, Agent, or Firm* — Erickson Kernell IP, LLC; Mark C. Young

(57) ABSTRACT

The present invention relates to a method for the position-controlled guidance of at least two pivotably movable cantilevered arms of an agricultural distribution machine over a ground surface wherein a relative position of the at least two pivotably movable cantilevered arms in relation to the ground surface is respectively detected and a realignment of the at least two cantilever arms is carried out via autonomous regulation based on the detected relative position of each cantilevered arm in response to a pivoting motion in relation to the ground surface. The method provides that the autonomous regulation is temporarily interrupted for at least one of the two pivotably movable cantilevered arms, wherein a positioning of one of the two pivotably movable cantilevered arms is carried out in a manually controlled manner during the interruption.

17 Claims, 4 Drawing Sheets

(56) References Cited

U.S. PATENT DOCUMENTS

| | | | | |
|---|---|---|---|---|
| 2004/0195356 A1* | 10/2004 | Ellsworth | ........... | A01M 7/0053 |
| | | | | 239/166 |
| 2011/0017849 A1* | 1/2011 | Trennenpohl | ........ | A01C 15/005 |
| | | | | 239/723 |
| 2011/0153168 A1* | 6/2011 | Peterson | .............. | A01B 79/005 |
| | | | | 701/50 |
| 2013/0277442 A1* | 10/2013 | Ballu | .................. | A01M 7/0057 |
| | | | | 239/1 |
| 2013/0299601 A1 | 11/2013 | Ballu | | |

FOREIGN PATENT DOCUMENTS

| FR | 2690811 A1 | 11/1993 |
|---|---|---|
| FR | 2965454 A1 | 4/2012 |

* cited by examiner

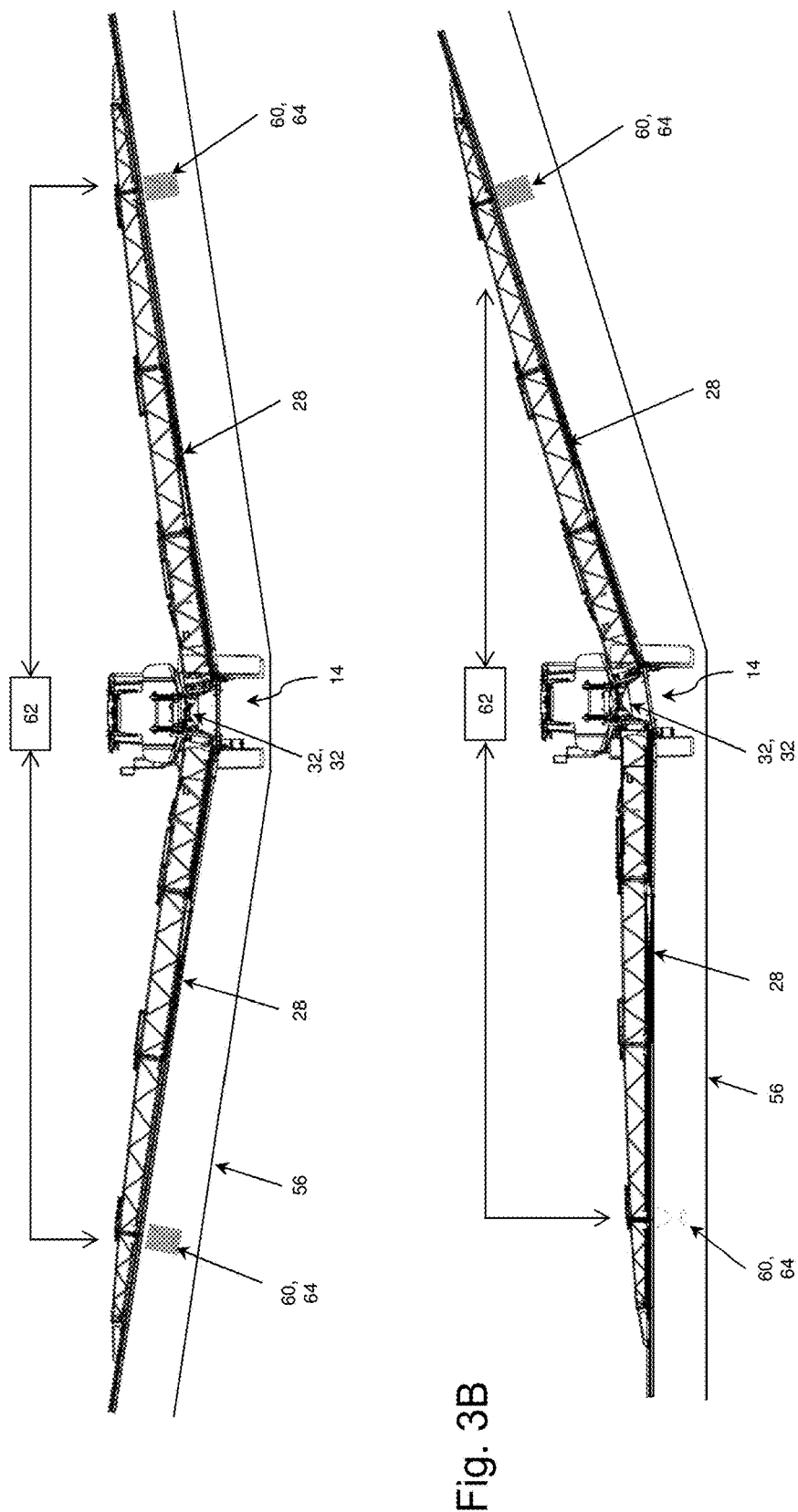

METHOD FOR MOTION CONTROL AND/OR REGULATION OF AN AGRICULTURAL DISTRIBUTION DEVICE

CROSS-REFERENCE TO RELATED APPLICATIONS

This application claims priority from German Application No. DE 10 2015 102 422.5 filed Feb. 20, 2015, the contents of which are incorporated herein by this reference.

FIELD OF THE INVENTION

The present invention relates to a method for the motion control and/or regulation of a distribution device for spreading liquid and/or solid active agents, the distribution device being arranged on an agricultural distribution machine.

BACKGROUND OF THE INVENTION

Field sprayers and distribution devices or spray booms hitched to work machines, such as tractors, in some cases have very large working widths of 20 meters and more. Such wide spray booms are folded in for transport purposes. In the field, symmetrical cantilevered arms of several meters length are located on both sides of the work machine, which cantilevered arms have a varying spacing from the ground according to surface conditions and field relief. Since the downward-directed nozzles for spreading the spraying agent, which nozzles are arranged on the cantilevered arms, each have a defined spray cone, varying the spacing of the nozzles to the ground results in an uneven covering of the field with spraying agent. In addition, the danger of the spraying agent drifting greatly increases with the spacing of the spray nozzles from the ground increasing, since even slight air movements negatively affect the targeted distribution of finely dispersed drops. With increasing cantilever dimensions and the associated working width, there is therefore a necessity to guide the spray boom at as uniform a spacing from the ground as possible, and also to have the spray boom follow the ground relief or a ground contour, respectively, since already minimal inclines of the spray boom lead to large spacing differences of the nozzles to the ground.

A method for motion control or regulation of a spray boom is already known from the prior art. EP 2 591 657 A1, for instance, describes a mobile device for spreading liquid and/or solid active agents, the device comprising a spreading boom, which consists of a middle part and lateral cantilevered arms and which is pivotably mounted at a suspension point. For motion control, the middle part is coupled with a frame section of the vehicle via at least one controllable actuating apparatus. The actuating apparatus produces a largely actuating power-free mechanical connection in a first operating mode, in which the spreading boom is to the greatest extent possible decoupled from torques about the pivot axis through the suspension point, which torques result from vehicle movements about the longitudinal vehicle axis. In a second operating mode or in an adjustment mode, respectively, the actuating apparatus additionally induces a defined actuating power or a defined actuating torque between the middle part and the frame section for the purpose of pivoting the spreading boom relative to the frame. This is carried out largely independently of disturbance torques resulting from vehicle movements.

Guiding the spray boom primarily parallel to a ground surface can indeed be realized by means of the above-described system. However, there is no method disclosed that would enable an adaptation of, for instance, only one side or one cantilevered arm of the spray boom.

Furthermore, EP 2 186 405 A1 describes a spray boom and a method for controlling it, by means of which it is intended to approximately enable an adaptation of the spray boom to a ground relief or to a ground contour. The spray boom has at least two cantilevers arranged via two joints at a middle part, with these cantilevers being in turn arranged to be pivotable in relation to one another via horizontal axles, and with the cantilevers being connected by means of joints, and with a setting movement of the cantilevers in relation to one another being actively controllable. The setting movement is carried out by means of an actuator, where the actuator can in turn be designed as a hydraulically operating cylinder.

The problem arising with such spray booms, in which the cantilevers can be pivoted about horizontal axles by means of hydraulic cylinders, is that the cantilevers do not always move symmetrically to each other. If, for instance, both cantilevers are pivoted, they do not move evenly in relation to each other due to the uneven movements of the cylinders assigned to the respective cantilevers, and this in turn causes a torque to act on the boom suspension, which torque needs to be absorbed and which also negatively affects the distribution of the spray liquid. Although various attempted solutions are known for this case, for example by controlling the cylinders by means of flow divider valves, these various attempts are also subject to construction-related inaccuracies, so that it cannot be ensured that the cantilevers move symmetrically to each other.

Beyond that, FR 2 965 454 A1 discloses a spray boom with two pivotably movable cantilevered arms, of which the positions are detected. The cantilevered arms are guided in a position-controlled manner by the relative positions of the pivotably movable cantilevered arms to the ground surface being respectively detected and a realignment of the at least two cantilevered arms being carried out in the context of an autonomous regulation based on the detected relative positions resulting from a pivoting motion in relation to the ground surface. A further regulation parameter can override the alignment such that one of the arms can optionally be pivoted more strongly than is specified by the autonomous regulation.

FR 2 690 811 A1 finally discloses a spray boom control in which it is possible to switch between an automatic regulation and a manually superimposable position control, where the manually set position is first maintained for a definable period of time until the automatic regulation sets in.

SUMMARY

A primary object of the present invention is to provide an improved control method of a distribution device or of a spray boom, respectively, for spreading solid or liquid agents, in which not only the pivoting of at least two lateral cantilevers about horizontal pivoting axles is carried out approximately symmetrical to a middle part such that the spray boom can be adapted in its motion control to a ground contour, but moreover by means by which an uneven and manually influenceable control is also made possible, for instance, for the purpose of avoiding obstacles on one side of the boom, which are difficult to detect by sensors.

This object is achieved by a method for the motion control of a distribution device or of a spray boom, respectively. As a result of these measures, two lateral cantilevers, which are mounted pivotably about horizontal axles and connected to a middle part, are operatively connected to means and/or coupling elements in such a manner that the motion of at least one cantilever is symmetrically transmitted onto an oppositely positioned cantilever by way of the means, whereby it is achieved that the cantilevers are pivoted approximately symmetrical relative to the middle part. It can additionally be provided that the distribution device is pivotably mounted about a central suspension pivot point and that an adaptation of at least one cantilever to a ground contour is carried out by way of symmetrical pivoting of both cantilevers and rotating of the distribution device about the suspension pivot point.

The invention provides a method for the position-controlled guidance of at least two pivotably movable cantilevered arms of an agricultural distribution machine over a ground surface, where a relative position of the at least two pivotably movable cantilevered arms in relation to the ground surface is detected and a realignment of the at least two cantilevered arms is carried out in the context of an autonomous regulation based on the respectively detected relative position in response to a respective pivoting motion in relation to the ground surface. The method provides that the autonomous regulation may be overridden by a further, manually specifiable regulation parameter for at least one of the at least two pivotably movable cantilevered arms, which manually specifiable regulation parameter at least temporarily lifts or pivots at least one of the at least two pivotably movable cantilever arms by way of manual specification more strongly than is specified by the autonomous regulation. The method furthermore provides that the autonomous regulation is temporarily interrupted for at least one of the at least two pivotably movable cantilevered arms such that a desired positioning of the at least one of the at least two pivotably movable cantilevered arms can be carried out, for instance, in a manually controlled manner during the interruption. In addition, a desired position for the at least one of the at least two pivotably movable cantilever arms in relation to the ground surface is specified in a manually controlled manner during the interruption of the autonomous regulation and is subsequently maintained in a regulated manner over a definable time interval or until the interruption of the manual specification.

When the desired path is obstructed, the relative spacing of the at least one of the at least two pivotably movable cantilevered arms in relation to the ground surface is selected to be increased in comparison to its relative spacing in relation to the ground surface under autonomous regulation. The method has the special advantage that no mandatory mechanical coupling of the two cantilevered arms is required; they can rather be adjusted largely autonomously and independently of each other in their respective angular positions, if this is required in the individual case for the purpose of avoiding obstacles or for other reasons. A weight transfer or the employment of the adjustment torques of the respective other cantilevers could possibly be advantageous and might facilitate the adjustment procedure, but is not mandatory in the present instance.

An alternative variant of the method could provide that the autonomous regulation is overridden by a manually specifiable regulation parameter, which first provides a symmetrical pivoting of both cantilevered arms by an approximately equal pivot angle, with torquing of both cantilevered arms through a rotation angle being carried out simultaneously, in a time-delayed manner, or successively.

The method can moreover provide that the autonomous regulation of the realignment of the cantilever arms is resumed immediately after the interruption or immediately after the definable time interval. This is therefore a type of bi-stable system, which shifts from its otherwise automatic regulated operation into a partly manual operation by a one-time manual intervention, where the partly manual operation is, however, maintained without further interventions until the user gives another order to return into the automatic regulated mode.

Apart from a manual intervention, it would also be conceivable that the intervention into the automatic regulated operation is carried out by specifications or based on values from additional sensors, respectively.

The relative position of the at least two cantilever arms in relation to the ground surface can be detected by means of, for instance, one or more spacing sensors, which are respectively assigned to the at least two cantilevered arms, with the autonomous regulation and/or the maintaining of the manually specified desired position being carried out in a regulated manner under operative connection to the respectively assigned spacing sensors.

The invention furthermore comprises a distribution device for spreading liquid and/or solid active agents, such as fertilizers, spraying agents, or the like. This distribution device comprises a spreading boom arranged on a self-propelled or towed vehicle, which spreading boom is mounted to be pivotable about a suspension pivot point extending approximately parallel to a driving direction, and which has a middle part and lateral cantilevers, which are pivotable via horizontal pivoting axles. The length of the cantilevers can vary according to intended use. The cantilevers can typically be designed with a length of approximately 12 to 18 meters for each cantilever such that, in consideration of the middle part with a width of approximately 2 to 3 meters, a total working width of the spray boom can amount to up to 40 meters or more. The lateral cantilevers are connected to the middle part by means of vertical axles. The cantilevers can be pivoted by means of these vertical axles, namely between a first work position, in which the cantilevers and the middle part stand approximately in a line transversely to the driving direction, and a second transport position, in which the cantilevers are folded toward the middle part such that a transport width required for driving on the road is achieved.

If "pivotability of the cantilevers" or "rotating of the distribution device approximately parallel to the driving direction" is referred to in the present context, this is not intended to exclude other degrees of freedom of movement of the distribution device. The present invention, however, relates to movements in parallel to the driving direction, where the cantilevers, which project transversely to the driving direction on both sides of a middle part, perform up and down movements, or where the distribution device is rotated clockwise and/or counterclockwise.

As a rule, spray nozzles for spreading the respective agent or the spraying agent are arranged at the cantilevers and at the middle part. In the context of the present invention, the design of these spray nozzles can be defined in terms of the desired spreading quantity of the spraying agent to be distributed per time or per surface area. The appearance of the spray jet can have diverse forms, such as, for instance, fan-shaped or conical designs. It is also possible to design the distribution device with several different nozzles. According to the purpose of use, the number of the spray nozzles per cantilever or per distribution device, respectively, can also vary.

According to the invention, the spray boom is formed as one middle part and at least two lateral cantilevers. The connection is respectively carried out via pivoting axles or pivot points, which have to be designed according to requirements in order to be able to absorb the forces occurring through the boom rods, and at the same time ensure a sufficient resilience so that the spray boom is protected from damages or cannot be damaged, respectively, under any occurring operating conditions.

In order to enable a height adjustability in addition to the pivoting process of the cantilevers or of the spray boom, it is also provided that a support element is formed between the machine frame of the agricultural distribution machine and the middle part of the spray boom such that the spray boom can be adjusted in its height. In order to meet these requirements, the support element can be formed, for instance, by, parallel arranged rod assemblies or so-called parallelogram linkages or the like. Also conceivable are additional vertical axles, which are designed such that the spray boom would be shiftable via these axles along their height. The middle part of the spray boom is preferably mounted at the support elements via a suspension point. Preferably, this is carried out by means of a pivot bearing, via which the spray boom can rotate or pivot, respectively. The suspension point can be selected such that it is located at the center of gravity of the distribution device, where the center of gravity is, as a rule, located in the center, that is, in a symmetrically constructed distribution device in the middle of the distribution device parallel to the driving direction. It is, however, also conceivable to arrange the suspension point outside of or not at the center of gravity.

The motion control of the two cantilevers is carried out by means of at least one actuator, which is arranged between the two cantilevers or between the middle part and one of the two cantilevers, preferably, however, by means of at least two separate actuators, which are also controllable independently of each other to provide for the manually specifiable deflection control of the spray boom arms. The cantilevers are pivoted about the horizontal pivoting axles upward or downward in relation to the ground contour by position changes and/or length changes of the actuator or the actuators, respectively. The actuators can be respectively formed by a hydraulic cylinder or by a hydraulic motor. The hydraulic motor can be arranged in different ways according to the desired features. In the context of the invention, radial piston motors, axial piston motors, or gear pumps, for instance, can be used for the hydraulic motor. Non-hydraulic designs of the actuator are also conceivable. But other actuating apparatuses are also conceivable, such as for example, electromotively operated linear motors or the like.

The actuator can be arranged in various ways. The invention, for instance, provides for the actuator to be mounted between the two cantilevers so that these are thereby connected. It would also be conceivable, however, to mount the actuator such that it would be immediately connected to only one cantilever, for example. A variant of the present invention with two separate actuators can also be designed such that each of these actuators is respectively supported at the middle part and respectively acts upon one of the arms.

In the distribution device according to the invention, it is in this context that at least one of the cantilevers is assigned at least one actuator in such a manner that this cantilever can be moved about the horizontal pivoting axle toward a ground contour or away from it in relation to the middle part, and that actuating means and/or transmission means are assigned to the distribution device for the purpose of adaptation of a cantilever position to the ground contour by deflection of at least one of the two cantilevers in relation to the middle part. According to a first aspect of the invention, the actuating means are manually activatable by a machine operator of the distribution machine. In this manner, a spray boom is provided, for which it is not only possible to pivot the cantilevers symmetrically and/or automatically, but which also makes unilateral pivoting possible. The spray boom can optionally provide an automatic adaptation of the respective pivoting positions of the two cantilevers, or also a manual adaptation of the respective pivoting positions. The advantage of such a regulation or control option, respectively, particularly consists in enabling a quicker regulation or a quicker intervention, respectively. This provides the possibility of avoiding individual obstacles while traversing and spreading spraying agents, which obstacles would not be detected by sensors or would be detected too late, as the case may be. These could be, for instance, obstacles in the form of rods or pointed objects or the like, which can only by detected with difficulty by the present sensors, as the case may be, such that collisions of any kind can be reliably prevented by means of a manual intervention control. In this manner, it is likewise possible to avoid obstacles without having to lift the entire spray boom at the same time, which would in turn, of course, negatively affect the operational quality.

In one variant of the distribution device according to the invention, the actuating means and/or transmission means can be equipped in such a manner that movement in relation to the ground contour caused by one of the two cantilevers is approximately symmetrically transmitted to the other cantilever. In addition, the transmissions of the setting movements can be modifiable by manual intervention from the machine operator and/or superimposable by additional deflections.

The method proposed with the invention thus serves for the position-controlled guidance of at least two pivotably movable cantilevered arms of an agricultural distribution machine over a ground surface, where a relative position of the at least two pivotably movable cantilevered arms in relation to the ground surface is respectively detected and a realignment of the at least two cantilevered arms is carried out in the context of an autonomous regulation in dependence on the respectively detected relative position via a respective pivoting motion in relation to the ground surface. The method provides that the autonomous regulation is temporarily interrupted for at least one of the at least two pivotably movable cantilevered arms, with a positioning of the at least one of the at least two pivotably movable cantilevered arms being carried out in a manually controlled manner during the interruption. In addition, it can be provided that a desired position for the at least one of the at least two pivotably movable cantilevered arms in relation to the ground surface is specified in a manually controlled manner during the interruption of the autonomous regulation and is subsequently maintained in a regulated manner over a defined time interval.

When the desired path is obstructed, the relative distance of the at least one of the at least two pivotably movable cantilever arms in relation to the ground surface is preferably increased as compared to its relative distance in relation to the ground surface under autonomous regulation. The autonomous regulation of the realignment is preferably resumed immediately after the interruption or immediately after the defined time interval. As an alternative regulation method or control method, it can be provided that at least one of the at least two pivotably movable cantilevered arms is manually controlled during an interruption, and at least one further of the at least two pivotably movable cantilevered arms continues to be autonomously regulated. It can furthermore be reasonable that a respective interruption of the autonomous regulation by manual control may be carried out for the at least two cantilevered arms independently of each other.

Additionally, it can be provided that the relative position of the at least two cantilevered arms in relation to the ground surface can be detected by means of one or more distance sensors, which are respectively assigned to the at least two cantilevered arms, and that the autonomous regulation and/or the maintaining of the manually specified desired position is carried out in a regulated manner under operative connection to the respectively assigned distance sensors.

In order to achieve a symmetrical motion of the cantilevers, the cantilevers are operatively connected to coupling means or to coupling elements, respectively, such that pivoting motions of at least one of the cantilevers is symmetrically transmitted to the oppositely positioned cantilever. In a preferred embodiment, the coupling means or the coupling elements, respectively, are formed by an arrangement of pivoting levers and coupling rods. The invention thus provides a rotatably mounted pivoting lever, which is rotatably arranged centrally or approximately centrally, respectively, between the at least two cantilevers. The pivoting lever is provided with joints, at which, in turn, coupling rods can be arranged. Thus a first coupling rod can be arranged between a first joint, which is located in the front in relation to the driving direction on the pivoting lever, and a left cantilever. In addition, a second coupling rod can be arranged between a second joint, which located in the back in relation to the driving direction on the pivoting lever, and a right cantilever. A reverse arrangement would optionally also be possible. By position changes and/or length changes of the actuator and the resulting motion of at least one of the cantilevers, a transmission of this motion to the pivoting lever is carried out by means of the coupling rod via a first or second joint, whereby the pivoting lever performs a corresponding rotary movement. Via the oppositely positioned first or second joint, this rotary movement is transmitted by the further coupling rod to the oppositely positioned cantilever, whereby both cantilevers are each pivoted upward or downward in relation to the ground surface symmetrically or approximately symmetrically, respectively, to each other.

Apart from the described arrangement of pivoting levers and coupling rods, various other coupling elements or coupling means are also conceivable. A coupling by means of a rotatable gear wheel and gear racks arranged respectively to the left and the right thereof is thus also conceivable. Various other mechanical coupling elements are likewise conceivable. A design of the means in one part is also conceivable. Moreover, hydraulic means could be used; hydraulic cylinders could preferably be used in such a coupling, with the hydraulic cylinders being coupled employing a master/slave principle. This means that their size can be such that oil is first displaced by the motion of at least one cantilever by a cylinder, and by means of this displaced oil quantity, a further cylinder is moved or controlled, respectively. Electronic means could also be used, which are controlled by means of position sensors, for instance.

The variant of an electro-hydraulic coupling of the actuating components can also be of advantage. Such an electro-hydraulic coupling combines the respective advantages of purely electrical and purely hydraulic couplings. In the proposed embodiment of the electro-hydraulic coupling, the sensor signals, which are detected electronically, for instance, can be processed and employed or used, respectively, for the control of hydraulic cylinders. It is in particular conceivable that an angle potentiometer is arranged between the middle part and at least one of the cantilevers, which angle potentiometer is in each case suited for determining the angular positions between the middle part and the cantilever. Based on the values of this angle potentiometer, the cylinder, which is assigned to the oppositely positioned cantilever, for instance, can be controlled. In particular, this could be carried out for so long until an angle potentiometer arranged between this cantilever and the middle part supplies the same value as the oppositely positioned angle potentiometer. In particular, synchronized cylinders can be used as cylinders in this instance. Such cylinders offer the advantage of quick adjustability.

Generally, the coupling can also be carried out in other diverse ways, however, the coupling should be designed such that a nearly play-free, symmetrical transmission of the pivoting motion from one cantilever to an oppositely positioned cantilever can be ensured.

Apart from the symmetrical motion of the cantilevers, the weight distribution is also significantly improved by the coupling of the cantilevers according to the invention; this means that by the connection of the cantilevers, weight differences and torques resulting therefrom are mutually transmitted or partly mutually canceled, respectively, whereby the center of gravity of the spray boom is always located approximately in the center between the two cantilevers, which means that significantly less force acts on the suspension or on the boom guidance when the suspension is located at the center of gravity.

By the coupling of the two lateral cantilevers according to the invention, it is moreover achieved that only one actuator is required for pivoting the lateral cantilevers about the horizontal axle.

The adaptation of the spray boom or of at least one of the two cantilevers, respectively, to the ground contour can be carried out by an actual value detector associated with the distribution device or to the agricultural distribution machine, respectively, which actual value detector first determines the relative position or spacing of the distribution device in relation to a ground contour or to a ground surface. In this context, detection of the actual value is carried out by means of, for instance, ultrasonic sensors, which are arranged on the side of the spray boom facing the ground in order to thus determine the current distance from the boom to the ground surface. But other types of sensors are also conceivable. Detecting the actual value could likewise be carried out based on GPS data. The values determined by the actual value detector are transmitted to a data processing device or to a processor unit. This can be carried out by means of a cable connection or also in a wireless manner. If the values determined by the actual value detector deviate from a predefined desired value, the actuator is controlled by the processor unit to pivot the cantilevers, or a signal is output, respectively, whereby the actuator carries out a position change and/or length change and thus carries out a change of the relative position of the cantilevers such that both cantilevers in turn move in a direction toward the ground surface or away from it. The data processing device or the processor unit, respectively, can in principle be any type of electronic device, which is capable of performing a desired/actual value comparison and of outputting a signal or an actuating value based on the desired/actual value comparison. Computer-based systems have proven successful for this purpose.

In the method according to the invention for the motion control and/or regulation of a distribution device for spreading liquid and/or solid active agents, the distribution device being arranged on an agricultural distribution machine, it is provided that the torsion of the distribution device is carried out in dependence on the relative position in relation to a ground contour, which relative position is determined by an actual value detector, and/or that the torsion of the distribution device or the lifting and lowering, respectively, of at least one of the cantilevers is influenced by manual intervention. In this manner and according to the provisions of the distribution device and/or of its control, it can be provided that the machine operator can manually influence and/or accelerate the lifting and lowering and/or modify an automatically specifiable motion of at least one of the cantilevers.

The present invention can also be characterized by the term "artificial horizon". This means that the spray boom approximately follows the motion of the spraying vehicle over a longer period of time. Short-duration swaying motions and vehicle body movements are then subtracted out or compensated for, respectively, by the boom regulation system.

If the boom regulation system is active during the application process, the operator can manually override the regulation of the boom unilaterally, that is, for one side of the entire boom cantilever. By pressing a button (button: lift/lower the respective boom side), the automatic height regulation can be deactivated unilaterally, for example. The user can thus manually control the deactivated cantilever by means of one and the same button and move it into a desired position, for instance across an obstacle. In the process, the deactivated cantilever is regulated to or held at, respectively, a type of "artificial horizon" by the regulation system. The "artificial horizon" in this instance relates to the vehicle in the long term. Short-term swaying motions are not taken into account; long-term changes, such as for instance a slope, are followed by the horizon.

If the boom regulation system is unilaterally deactivated and if the operator presses no button, the respective side will remain in its current position (in relation to the "artificial horizon"). During the intervention by the operator or during the unilateral deactivation, respectively, regulation of the second cantilever side continues in the normal regulation operating mode. Only after a deliberate pressing of a specific button or after a set dwelling time does the deactivated cantilever side return to the automatic operating mode. This is therefore a "bistable system", which can be brought into the one or the other mode, respectively, by one-time control commands.

While the previously known systems do allow unilateral regulation of the booms, the second side, however, is not held in relation to a reference point and is only deactivated for so long until the user intervenes. In contrast to a two-sided, automated cantilever regulation system, the boom according to the invention and the method according to the invention offer the operator the possibility to attain an operating mode of a "unilaterally position-guided, non-automated height regulation", which is characterized by manual operability, by applying specific machine operations or interventions. The two-sided regulated operation can be returned to by further operation. The uninfluenced cantilever side in each case remains continuously in the automated regulated operation.

The method according to the invention is particularly suited for the position control and/or regulation of the cantilever arms of a distribution device for spreading liquid and/or solid active agents, such as fertilizers, spraying agents, or the like. The distribution device can, in particular, have a spreading boom with a middle part, which spreading boom is arranged at or mounted on a self-propelled or towed vehicle and which is mounted to be pivotable about a suspension axis extending approximately parallel to a driving direction, and lateral cantilevers which are pivotable via horizontal pivoting axles. The length of the cantilevers can vary according to intended use. The cantilevers can typically be designed with a length of approximately 12 to 18 meters for each cantilever such that, in consideration of the middle part with a width of approximately 2 to 3 meters, a total working width of the spray boom can amount to up to 40 meters or more. The lateral cantilevers are connected to the middle part by means of vertical axles. The cantilevers can be pivoted by means of these vertical axles, namely between a first work position, in which the cantilevers and the middle part stand approximately in a line transversely to the driving direction, and a second transport position, in which the cantilevers are folded toward the middle part such that a transport width required for driving on the road is achieved.

If "pivotability of the cantilevers" or "rotating of the distribution device approximately parallel to the driving direction" is referred to in the present context, this is not intended to exclude other degrees of freedom of movement of the distribution device. The present invention, however, relates only to movements parallel to the driving direction, where the cantilevers, which project transversely to the driving direction on both sides of the middle part, are moveable up and down, or where the distribution device is rotated clockwise and/or counterclockwise.

Spray nozzles for spreading the respective agent or the spraying agent are arranged at or mounted on the cantilevers and at the middle part. In the context of the present invention, the design of these spray nozzles can be defined in terms of the desired spreading quantity of the spraying agent to be distributed per time or per surface area. The appearance of the spray jet can have diverse forms, such as, for instance, fan-shaped or conical designs. It is also possible to design the distribution device with several different nozzles. According to the purpose of use, the number of the spray nozzles per cantilever or per distribution device, respectively, can also vary.

The spray boom is formed of the middle part and at least two lateral cantilevers. The connection is respectively carried out via pivoting axles or pivot points, which have to be designed according to requirements in order to be able to absorb the forces occurring through the boom rods, and at the same time ensure a sufficient resilience so that the spray boom is protected from damages or cannot be damaged, respectively, under any occurring operating conditions.

In order to enable height adjustability in addition to the pivoting process of the cantilevers or of the spray boom, it is also provided that a support element is formed between the machine frame of the agricultural distribution machine and the middle part of the spray boom such that the spray boom can be adjusted in its height. In order to meet these requirements, the support element can be formed, for instance, by, parallel arranged rod assemblies or so-called parallelogram linkages or the like. Also conceivable are additional vertical axles, which are designed such that the spray boom would be shiftable via these axles along their height. The middle part of the spray boom is mounted to the support elements through a suspension axis. Preferably, this is carried out by means of a pivot bearing, about which the spray boom can rotate. As a general rule, the position of the suspension axis is selected such that it is located at the center of gravity of the distribution device, that is, in a symmetrically constructed distribution device, in the middle of the distribution device and parallel to the driving direction. It is, however, also conceivable to arrange the suspension axis outside of or not at the center of gravity.

The motion control of the two cantilevers is carried out by means of at least one actuator, which is arranged between the two cantilevers. The cantilevers are pivoted about the horizontal pivoting axles upward or downward in relation to the ground contour by position changes and/or length changes of the actuator. The actuators can be respectively formed by a hydraulic cylinder or by a hydraulic motor. The hydraulic motor can be arranged in different ways according to the desired features. In the context of the invention, radial piston motors, axial piston motors, or gear pumps, for instance, can be used for the hydraulic motor. Non-hydraulic designs of the actuator are also conceivable. But other actuating apparatuses are also conceivable, for example, electromotively operated linear motors or the like.

The actuator can be arranged in various ways. The invention, for instance, provides for the actuator to be mounted between the two cantilevers so that these are thereby connected. It would also be conceivable, however, to mount the actuator such that it would be immediately connected to only one cantilever, for example.

The method according to the invention serves for the position-controlled guidance of at least two pivotably movable cantilevered arms of an agricultural distribution machine over a ground surface, where a relative position of the at least two pivotably movable cantilevered arms in relation to the ground surface is detected and a realignment of the at least two cantilevered arms is carried out in the context of autonomous regulation of the cantilevered arms in dependence on the respectively detected relative position via a respective pivoting motion in relation to the ground surface. The method provides that the autonomous regulation is temporarily interrupted for at least one of the at least two pivotably movable cantilevered arms, with positioning of the at least one of the at least two pivotably movable cantilevered arms being carried out in a manually controlled manner during the interruption. A desired position for the at least one of the at least two pivotably movable cantilevered arms in relation to the ground surface is specified in a manually controlled manner during the interruption of the autonomous regulation of the cantilevered arms and is subsequently maintained in a regulated manner over a defined time interval, whereby it is possible to avoid obstacles, which can only be detected with difficulty by a sensor system. When the desired path is obstructed, the relative distance of the at least one of the at least two pivotably movable cantilevered arms in relation to the ground surface is selected to be increased in comparison to its relative distance in relation to the ground surface under autonomous regulation. It is also possible that the autonomous regulation of the alignment of the cantilevered arms is resumed immediately after the interruption or immediately after the defined time interval such that the previous self-acting regulation continues.

The relative position of the at least two cantilevered arms in relation to the ground surface can be detected by means of, for instance, one or more distance sensors, which are respectively assigned to the at least two cantilevered arms, such that the autonomous regulation and/or the maintaining of the manually specified desired position is carried out in a regulated manner under operative connection to the respectively assigned distance sensors. At least one of the at least two pivotably movable cantilevered arms can be manually controlled during an interruption, while at least one other of the at least two pivotably movable cantilevered arms can continue to be autonomously regulated. A respective interruption of the autonomous regulation by manual control for the at least two cantilevered arms can be carried out independently of each other, as the case may be.

It should also be noted that the coupling of the cantilevers according to the invention can also be used with a distribution device which cannot be rotated about a suspension axis or a center of gravity.

BRIEF DESCRIPTION OF THE DRAWINGS

In the following passages, the attached figures further illustrate exemplary embodiments of the invention and their advantages. Other characteristics, aims, and advantages of the present invention will become apparent from the following detailed description, given by way of a non-limiting example and with reference to the appended drawings.

FIGS. 3A and 3B show two schematic rear views of different deflection positions and ground surface adaptations of a spray boom, which is attached to the agricultural distribution machine.

DETAILED DESCRIPTION

Figure 1:
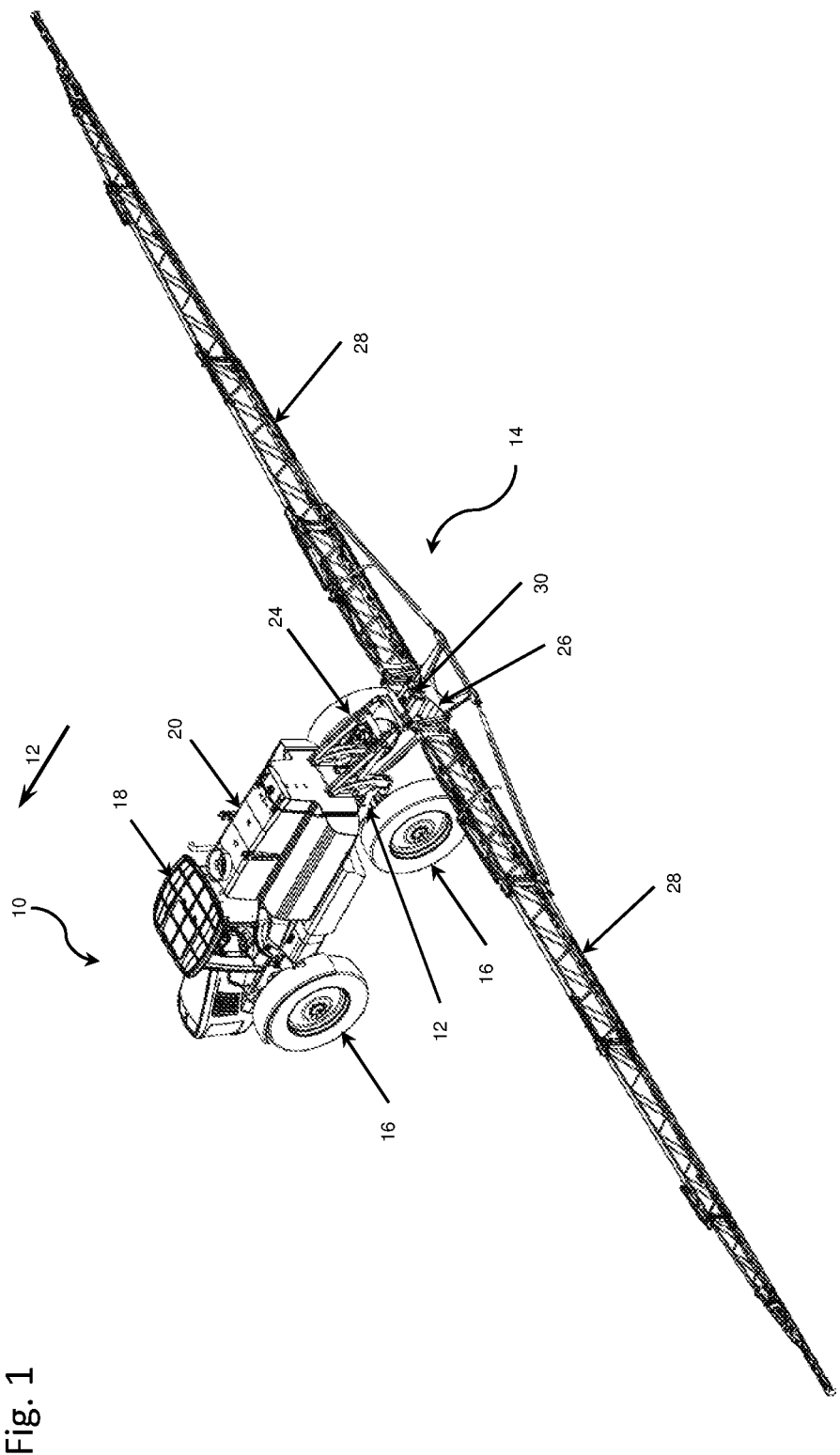
FIG. 1 shows a schematic perspective view of an agricultural distribution machine designed as self-propelled field sprayer with a distribution device or a spray boom, respectively, attached at the rear end.

The same or equivalent elements of the invention are each designated by the same reference characters in the FIGS. 1 to 3. Furthermore and for the sake of clarity, only the reference characters relevant for describing the respective figure are provided. It should be understood that the detailed description and specific examples of the method according to the invention, while indicating preferred embodiments, are intended for purposes of illustration only and are not intended to limit the scope of the invention.

The FIGS. 1 to 3, which are explained in more detail in the following passages, illustrate a preferred embodiment of a distribution device or of a spray boom, respectively, which can typically be attached as a trailer or semi-trailer to work machines, towing machines, or other carrier vehicles. Such carrier vehicles can be special purpose vehicles, for instance, which can carry a tank for the agent to be spread as well as carrying the distribution device according to the invention. Customary agricultural towing machines or tractors, respectively, can however likewise be used as towing vehicle.

The schematic perspective view in FIG. 1 shows an agricultural distribution machine designed as self-propelled field sprayer 10 with a distribution device 14 or a spray boom 14, respectively, attached at the rear end in work position and extending transversely to the driving direction 12. The distribution device 14 serves for spreading liquid and/or solid active agents, such as, for instance, fertilizers or plant protection agents. The field sprayer 10 essentially consists of two vehicle axles 16, a cabin 18 and a storage hopper 20, with all components being in turn connected by means of a machine frame 22. At the rear end of the field sprayer 10, the spray boom 14 is connected to the machine frame 22 via a support section or hitch 24. Such a support section 24 can either be a vehicle-fixed frame element that is formed by a machine frame, for instance. In a preferred manner, however, the support section 24 is arranged to be height-adjustable in relation to a machine frame, with the support section 24 being designed as four-joint arrangement in the present example.

The spray boom 14 comprises a middle part 26 with a suspension 30 having a suspension axis through which the spray boom 14 is pivotably connected to the support section 24, as well as cantilevers 28 fastened on both sides thereat, which cantilevers 28 can optionally be designed to be once or multiply foldable so that they can, for example, be brought into an arrangement suited for driving on the road or for transport purposes. A plurality of spray nozzles, for instance (not illustrated here), for the even and/or controlled spreading of liquid spraying agents or other spreading goods can be arranged on the cantilevers 28 or on the cantilevered arms 28 as well as at the middle part 26.

Figure 2A:
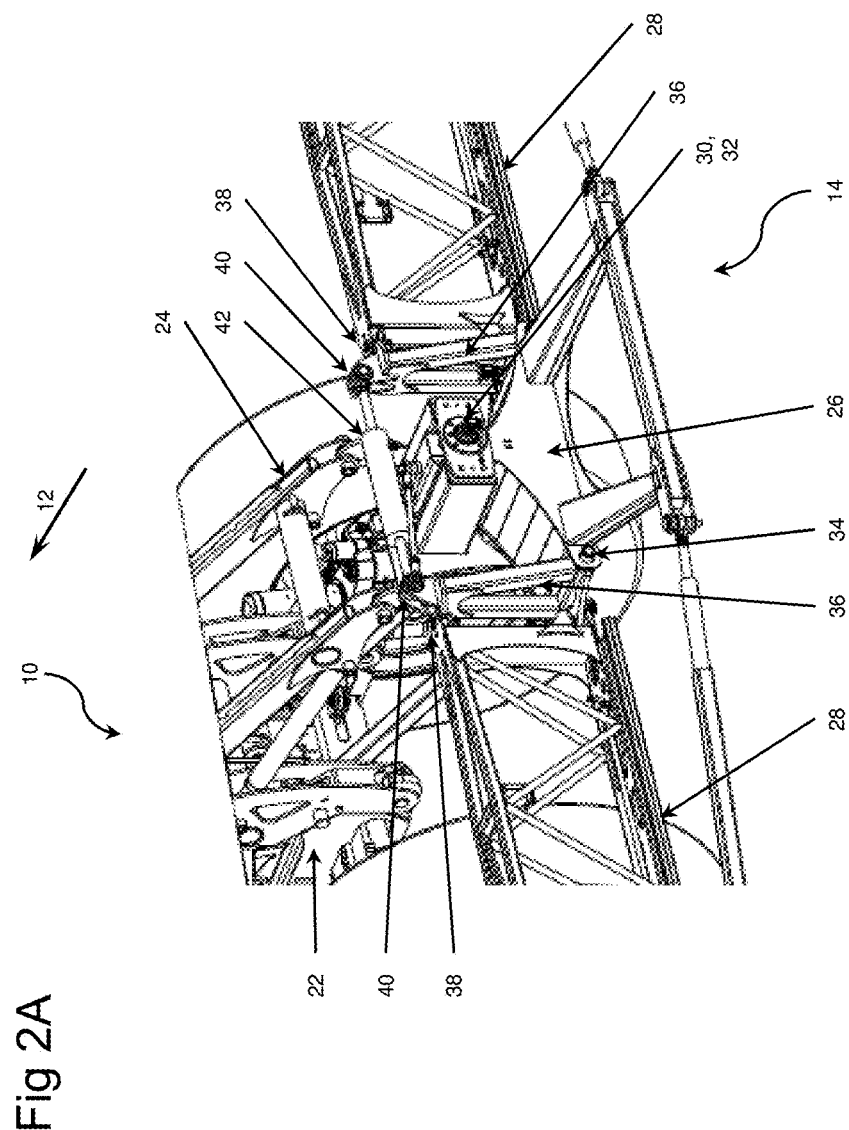
FIG. 2A shows a fragmentary, rear perspective view of a middle section of the distribution device as is illustrated in FIG. 1
Figure 2B:
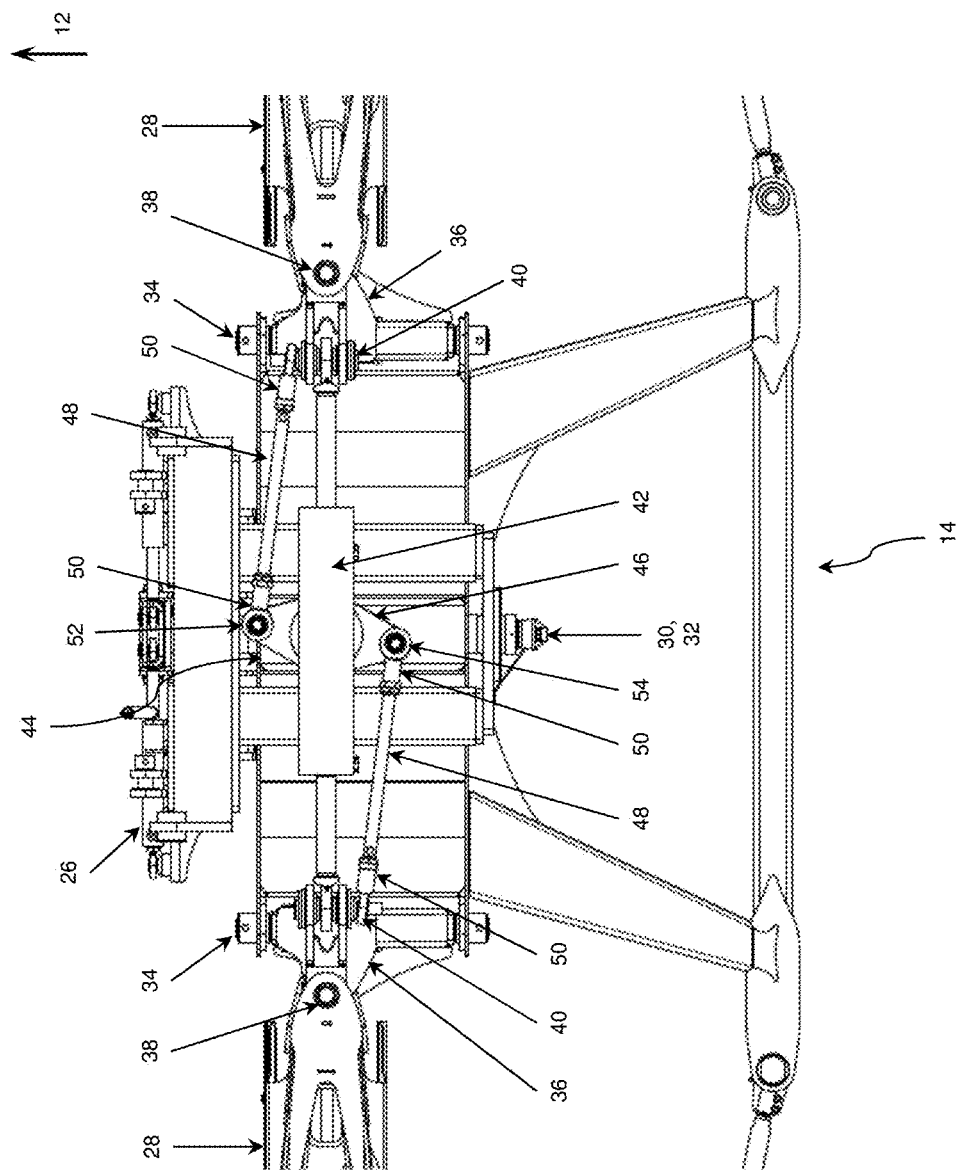
FIG. 2B shows a fragmentary, rear elevational view thereof.

The schematic detailed views of the FIGS. 2A and 2B respectively show the middle section of a distribution device 14, with FIG. 2A showing the middle section in a schematic perspective view, and FIG. 2B in a schematic top view. The distribution device 14 is connected to the machine frame 22 via the support section 24, with the support section 24 being designed as a height-adjustable four-joint arrangement. The middle part 26 of the spray boom 14 is provided with the suspension 30, which in the present example, is designed as a pivot bearing 30. The middle part 26 or the spray boom 14, is rotatably connected to the support section 24 by means of this suspension. The pivot bearing 30 is preferably arranged such that it is located approximately at the center of gravity of the spray boom 14, with the center of gravity being, as a general rule, located in the middle of the distribution boom 14. It would also be conceivable, however, to place the pivot bearing 30 outside of the center of gravity. Flanged bearings 36, which are rotatably mounted via horizontal pivoting axles 34, are arranged on both sides of the middle part 26. The flanged bearings 36 additionally support vertical pivoting axles 38, to which lateral cantilevers 28 are respectively mounted. The spray boom 14 can be pivoted via the vertical axles 38, namely between a first work position, in which the cantilevers 28 and the middle part 26 stand approximately in a line transversely to the driving direction 12, and a second transport position, in which the cantilevers 28 are folded toward the middle part 26 such that a maximum permissible width for transport is not exceeded. This pivoting can be carried out by means of hydraulic cylinders, for instance, but other actuating elements would also be conceivable. It should be noted here that the horizontal pivoting axles 34 as well as the vertical pivoting axles 38, respectively, have to be designed such that they can absorb and, as the case may be, dampen the strains caused by the spray boom 14, for instance, by motions of the field sprayer 10. Such a design is however not part of this invention and will therefore not be explained in more detail here.

The cantilevers 28 can be moved in a direction toward a ground surface or away from it in relation to the middle part 26 or to the field sprayer 10, respectively, via the horizontal pivoting axles 34. For this purpose, points of articulation 40 are provided in an upper area of the two flanged bearings 36, by means of which points of articulation 40 at least one actuator 42 can be mounted and whereby the two flanged bearings 36 or the two cantilevers 28, respectively, are both connected. The actuator 42 is preferably arranged such that the two flanged bearings 36 can be connected via the actuator 42, as is illustrated in FIGS. 2A and 2B. It would also be conceivable, however, to arrange the actuator 42 such that it is only connected to one of the flanged bearings 36. Preferably, the actuator 42 is formed by a hydraulic cylinder or by a hydraulic motor. The hydraulic motor can be arranged in different ways according to the desired features. In the context of the invention, radial piston motors, axial piston motors, or gear pumps, for instance, can be used for the hydraulic motor. A non-hydraulic design of the actuator 42, for instance, electromotively operated linear motors, would also be conceivable. In the present example, the pivoting of the cantilevers is performed in dependence on the extension length of the actuator 42, that is, if the actuator 42 is moved such that its extension length is reduced, then at least one of the cantilevers 28 is moved upward or away from the ground surface, respectively. If the extension length is increased, at least one cantilever 28 is moved downward, that is, in a direction toward the ground surface.

As is illustrated in the present example, the distribution device 14 provides a flanged bearing 36 as a connecting element between the middle part 26 and the two cantilevers 28, which flanged bearing 36 is, on the one hand, provided with horizontal pivoting axles 34 and, on the other hand, with vertical pivoting axles 38. Beyond that, the flanged bearing 36 has points of articulation 40 in an upper area, at which points of articulation 40 the actuator 42 can in turn be mounted. Such a design is however not mandatorily required in the context of the invention; other connections between the cantilevers 28 and the middle part 26 would be conceivable.

In order to ensure, on the one hand, that the motion of the two lateral cantilevers 28 is carried out symmetrically to each other, and on the other hand, that the center of gravity of the distribution device 14 is located approximately in the middle between the two cantilevers, the cantilevers 28 or the flanged bearings 36, respectively, are assigned means 44, by way of which the cantilevers are operatively connected. Here, in the illustrated exemplary embodiment of the figures, these are two means 44 or coupling elements 44, respectively, which are composed of an arrangement of pivoting levers 46 and coupling rods 48.

In this context, a pivoting lever 46 is arranged rotatably mounted centrally or approximately centrally between the flanged bearings 36. The pivoting lever 46 is assigned one first joint 52, which is located in the front in relation to the driving direction, and one second joint 54, which is located in the back in relation to the driving direction. One coupling rod 48 is arranged at each of these joints 52, 54. In this instance, a first coupling rod 48 is mounted between the first joint 52 and a point of articulation 40 of the right flanged bearing 36, and a second coupling rod 48 is mounted between the second joint 54 and a point of articulation 40 of the left flange bearing 36. The coupling rods 48 have additional ball joints 50 at their respective ends in order to compensate for axial or radial offset, as the case may be. If at least one of the cantilevers 28 is moved by a length change of the actuator 42, this motion is transmitted to the pivoting lever 46 by means of the coupling rod 48 assigned to this cantilever 28, whereby the pivoting lever 46 performs a clockwise or counterclockwise rotary movement. The direction of motion is reversed by this rotary movement, and the motion is transmitted to the other cantilever 28 or to the flanged bearing 36, respectively, via the second coupling rod 48, which is assigned to the cantilever 28 that is still in rest position.

By such a coupling of the cantilevers 28 with coupling elements 44 it is achieved that nearly any motion performed by one of the cantilevers 28 in a direction toward a ground contour or away from a ground contour is respectively symmetrically transmitted to the initially unmoving cantilever 28. Furthermore, it is achieved by the coupling according to the invention that the weight distribution of the spray boom 14 and thus the torque acting on the pivot bearing 30 and on the support section 24 is significantly reduced such that weight differences between the cantilevers 28 can be respectively mutually transmitted by means of the coupling.

It should be noted that the design of the coupling elements 44 as an arrangement of pivoting levers 46 and coupling rods 48 is only given by way of example. Generally, the coupling elements 44 can also be differently designed. It is also possible to employ other means 44 for the coupling, such as, for instance, electric or hydraulically or electro-hydraulically actuated means 44. Important for selecting the means 44 for the coupling is solely that they are designed such that, on the one hand, an approximately symmetrical motion of the cantilevers 28 to each other is ensured, and, on the other hand, that preferably only one actuator 42 is required for pivoting the two cantilevers 28.

The schematic illustrations of the FIG. 3 (FIG. 3A and FIG. 3B) respectively illustrate a rear view of a spray boom 14, which is arranged at the rear end of a distribution machine 10. In this instance, the spray boom 14 is first symmetrically pivoted and guided along a ground contour 56 in FIG. 3A, while in FIG. 3B it is only pivoted on the right side to be guided along a ground contour 56.

Thus, arranged at or mounted on or mounted on each of the cantilevers, is an actual value detector 60 in the form of a distance sensor 64, which actual value detector 60 detects the actual distance of the spray boom 14 or of the cantilevers 28, respectively, to a ground contour 56. The detected values are subsequently transmitted to a processor unit 62 and compared to a desired value stored in the processor unit 62. The transmission can in this instance be carried out by way of a cable connection or also in a wireless manner. By means of the difference between desired value and actual value, it is first determined by the processor unit 62, whether, for example, the cantilevers 28 have to be pivoted and in which direction. In the instance of a ground contour 56 as is illustrated in FIG. 3A, where the two cantilevers 28 have to be pivoted symmetrically to each other, the actuator 42 is controlled by the processor unit 62, and the actuator 42 carries out a position change or length change, respectively, whereby in turn the two cantilevers 28 are moved symmetrically to each other upward, that is, away from the ground contour. This is carried out until the values determined by the actual value detector 60 correspond to the desired values stored in the processor unit 62 again.

In the instance of a ground contour 56 as is illustrated in FIG. 3B, the two cantilevers 28 are similarly first pivoted by the actuator 42 and the coupling elements 44 symmetrically to each other; in addition, the spray boom 14 is rotated via the suspension or pivot bearing 30. The rotation of the spray boom 14 is carried out based upon the current position of the spray boom 14 as provided by the actual value detector 60. The rotation of the spray boom 14 is carried out counterclockwise as illustrated in FIG. 3B, while a clockwise rotation would of course also be possible with a corresponding ground contour 56. The rotation of the spray boom 14 is carried out until the position data determined by the actual value detector 60 correspond to the desired values stored in the processor unit 62 again.

Various approaches are conceivable in order to be able to rotate the spray boom 14. Thus, the pivot bearing 30 could be provided with a rotary actuator 32, for example. This rotary actuator 32 could in turn be controlled by the processor unit 62. An additional actuating element can also be provided, which actuating element is connected, on the one hand, to the middle part 26 at a distance from the suspension point 30, and which is connected, on the other hand, to the field sprayer 10 via a vehicle-fixed bearing, typically to the machine frame 22 or to the support section 24.

A few typical regulation interventions or control interventions by the machine operator, which can occur in certain operating situations, shall be explained in the following. Thus, driving situations can occur, in which the machine passes an obstacle, such as, a post, a well, or the like, with one cantilever arm (for example the right cantilever arm), which obstacle the machine would strike without manual control interventions. The cantilever arm that is not approaching the obstacle continues to be controlled in its position by the automatic boom regulation, where the two cantilever arms can first be aligned in parallel or horizontally aligned (cf. FIG. 1). On approaching the obstacle that is not detected or not detectable by the sensor system, the driver intervenes into the boom regulation, for instance, by pressing a button. The automatic operating mode is thus temporarily deactivated for the right side so that the driver can position, that is lift, the boom cantilever such that he can pass the obstacle without collisions. Such a situation is shown in the schematic view of FIG. 3B, for example. The driver here influences the processor unit 62 by manual command such that the processor unit 62 provides for lifting the right cantilevered arm 28.

If the driver does not want to change this status for a specific period of time, the specified regulation of the boom will be maintained during the rest of the drive. Without action to the contrary or a further action by the driver, the respective boom cantilever 28 (here the right one) will thus remain in the most recently set, lifted position (cf. FIG. 3B). After passing the obstacle identified and assessed as problematic by the driver, the driver can return to the automatic operating mode by way of appropriate operating action (for instance by pressing a button), whereby the cantilever positions will again be controlled by automatic regulation. Such an automatic operation can be expressed, for example, by the boom position according to FIG. 3A.

Such a unilateral pivoting process can once again be illustrated with reference to FIGS. 1 and 3B. According to FIG. 3B, the operator has the possibility of manually overriding the automatic regulation of the boom unilaterally (that is, on one side of the entire boom cantilever 28). The automatic height regulation can be deactivated unilaterally by, for example, pressing a button. The operator can thus manually control the deactivated cantilever by means of one and the same button and move it into a desired position, for instance when passing an obstacle. In the process, the deactivated cantilever is regulated to or held at a type of "artificial horizon". The "artificial horizon" in this instance relates to the vehicle in the long term. Short-term swaying motions are not taken into account; long-term changes, such as for instance a slope, are followed by the artificial horizon.

If regulation of the boom is unilaterally deactivated (here on the right side in FIG. 3B) and if the operator presses no further button, the respective side will remain in its current position. During the intervention by the operator or during the unilateral deactivation, respectively, the second cantilever side continues to be regulated in the normal regulation operating mode. Only after a deliberate pressing of a specific button or after a set dwelling time does the deactivated cantilever side return to the automatic operating mode.

It should be noted here that, according to the design of the method, this can be an overriding of the otherwise normally proceeding regulation of the boom. In the instance of the appearance of an obstacle and the corresponding manual control command by the driver, the method can thus provide a symmetrical lifting of both cantilever arms 28, after which a pivoting of the entire boom about the central horizontal rotation axis can be performed such that the same result is achieved as in a unilateral, manually specified lifting of only one arm 28.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

10 Agricultural distribution machine, field sprayer
12 Driving direction
14 Distribution device, spray boom
16 Vehicle axle
18 Cabin
20 Storage hopper
22 Machine frame
24 Support section
26 Middle part
28 Cantilever
30 Pivot bearing, suspension axis
32 Rotary actuator
34 Horizontal pivoting axle
36 Flange bearing
38 Vertical pivoting axle
40 Point of articulation
42 Actuator
44 Coupling element, means
46 Pivoting lever
48 Coupling rod
50 Ball joint
52 First joint
54 Second joint
56 Ground contour
60 Actual value detector
62 Data processing device, processor unit
64 Distance sensor

The invention claimed is:

1. A method for the position-controlled guidance of at least two pivotably movable cantilevered arms of an agricultural distribution machine over a ground surface, wherein the at least two pivotably movable cantilevered arms are each positioned adjacent a middle part, and wherein a relative position of the at least two pivotably movable cantilevered arms in relation to the ground surface is detected and a symmetrical realignment of the at least two pivotably movable cantilevered arms and/or of the distribution machine is carried out through autonomous regulation based on the detected relative position in response to a pivoting motion in relation to the ground surface, wherein the autonomous regulation may be overridden by way of manual control comprising a manually specifiable regulation parameter for at least one of the at least two pivotably movable cantilevered arms, which manually specifiable regulation parameter at least temporarily lifts or pivots at least one of the at least two pivotably movable cantilevered arms, wherein the autonomous regulation is temporarily interrupted by way of manual control for at least one of the at least two pivotably movable cantilevered arms, wherein a positioning of the at least one of the at least two pivotably movable cantilevered arms is carried out in a manually controlled manner during the interruption, wherein at least one angle potentiometer for the detection of an angular position between the middle part and the at least two pivotably movable cantilevered arms is arranged between the middle part and at least one of the at least two pivotably movable cantilevered arms, wherein an actuator that is assigned to an oppositely positioned cantilevered arm is controlled on the basis of the angular position detected by the at least one angle potentiometer;

and wherein a desired position for the at least one of the at least two pivotably movable cantilevered arms in relation to the ground surface is specified in a manually controlled manner during the interruption of the autonomous regulation and is subsequently maintained in a regulated manner over a definable time interval or until termination of manual control.

2. The method as recited in claim 1, in which the autonomous regulation is overridden by the manually specifiable regulation parameter, which first provides a symmetrical pivoting of each of the at least two pivotably movable cantilevered arms by an approximately equal pivot angle, wherein the application of a torque on each of the at least two pivotably movable cantilevered arms and/or of the distribution machine causing rotation thereof through a rotation angle is carried out simultaneously, in a time-delayed manner, or successively.

3. The method as recited in claim 1, in which, when a desired path of travel of at least one of the at least two pivotably movable cantilevered arms is obstructed, the relative distance of the at least one of the at least two pivotably movable cantilevered arms in relation to the ground surface is selected to be increased in comparison to its relative distance in relation to the ground surface under autonomous regulation.

4. The method as recited in claim 1, in which the autonomous regulation of the realignment of the cantilever arms and/or of the distribution machine is resumed immediately after the interruption or immediately after the definable time interval.

5. The method as recited in claim 1, in which a relative spacing of the at least two pivotably movable cantilevered arms in relation to the ground surface is detected by one or more distance sensors, which are respectively assigned to the at least two pivotably movable cantilevered arms, and the autonomous regulation and/or a maintaining of the manually specified desired spacing is carried out in a regulated manner under operative connection to the respectively assigned distance sensors.

6. The method as recited in claim 5, in which detected values determined by the one or more distance sensors are transmitted to a data processing device and compared to desired values stored therein, and a torquing of the distribution machine about a suspension axis is carried out based upon the difference between the detected values and the desired values.

7. The method as recited in claim 6, in which the torquing of the distribution machine is carried out by a rotary actuator arranged between the distribution machine and the middle part or by way of a linear actuator arranged between a support section or machine frame of the distribution machine and the middle part.

8. The method as recited in claim 1, in which at least one of the at least two pivotably movable cantilevered arms is manually controlled during an interruption, and at least one of the other of the at least two pivotably movable cantilevered arms continues to be autonomously regulated.

9. The method as recited in claim 1, in which a respective interruption of the autonomous regulation by manual control is carried out for the at least two pivotably movable cantilevered arms independently of each other.

10. The method as recited in claim 1, in which at least one actuator is connected to at least one of the at least two pivotably movable cantilevered arms, which is pivoted about a horizontal pivoting axle due to a position change and/or length change of the at least one actuator.

11. The method as recited in claim 1, in which at least one actuator is connected to each of the at least two pivotably movable cantilevered arms, wherein at least one of the at least two pivotably movable cantilevered arms is pivoted about a horizontal pivoting axle due to a position change and/or length change of the at least one actuator.

12. The method as recited in claim 11, in which means are assigned to each of the at least two pivotably movable cantilevered arms in such a manner that a weight transfer is carried out from one cantilevered arm onto a respective oppositely positioned cantilevered arm.

13. The method as recited in claim 12, in which the means provide an electro-hydraulic coupling of the at least two pivotably movable cantilevered arms.

14. The method as recited in claim 13, in which electronically detected sensor signals are processed and employed or used, respectively, as actuators for control of hydraulic cylinders.

15. The method as recited in claim 1, in which a transmission of movement settings is modifiable by manual intervention of a machine operator and/or may be overridden by additional deflections.

16. A method for the position-controlled guidance of at least two pivotably movable cantilevered arms of an agricultural distribution machine over a ground surface, wherein the at least two pivotably movable cantilevered arms are each positioned adjacent a middle part, the method comprising:

detecting a relative position of the at least two pivotably movable cantilevered arms in relation to the ground surface;

autonomously and symmetrically realigning the at least two pivotably movable cantilevered arms and/or the distribution machine based on the detected relative position;

providing a manual control for overriding the autonomous and symmetric realignment, the manual control comprising a manually specifiable regulation parameter for at least one of the at least two pivotably movable cantilevered arms, the manually specifiable regulation parameter set to at least temporarily pivot at least one of the at least two pivotably movable cantilevered arms, wherein the autonomous realignment is temporarily interrupted for the at least one of the at least two pivotably movable cantilevered arms such that positioning of the at least one of the at least two pivotably movable cantilevered arms is carried out in a manually controlled manner during the interruption, and wherein a desired position for the at least one of the at least two pivotably movable cantilevered arms in relation to the ground surface is specified in a manually controlled manner during the interruption of the autonomous regulation and is subsequently maintained in a regulated manner over a definable time interval or until termination of manual control;

wherein at least one angle potentiometer for the detection of an angular position between the middle part and the at least two pivotably movable cantilevered arms is arranged between the middle part and at least one of the at least two pivotably movable cantilevered arms, wherein an actuator that is assigned to an oppositely positioned cantilevered arm is controlled on the basis of the angular position detected by the at least one angle potentiometer.

17. The method as recited in claim 16, in which temporary interruption of the autonomous realignment is performed for the at least two pivotably movable cantilevered arms independently of each other.

* * * * *